E. G. SCHLEICHER.
STEERING AND RUNNING GEAR FOR VEHICLES.
APPLICATION FILED OCT. 14, 1913.

1,125,184.

Patented Jan. 19, 1915.

3 SHEETS—SHEET 1.

Witnesses:
William Miller
Chas. H. Almstaedt

Inventor
Edward G. Schleicher
By his Attorneys

E. G. SCHLEICHER.
STEERING AND RUNNING GEAR FOR VEHICLES.
APPLICATION FILED OCT. 14, 1913.
1,125,184.
Patented Jan. 19, 1915.
3 SHEETS—SHEET 3.
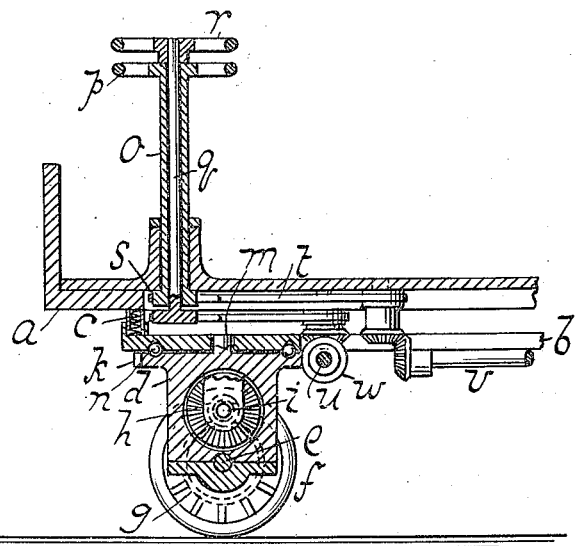
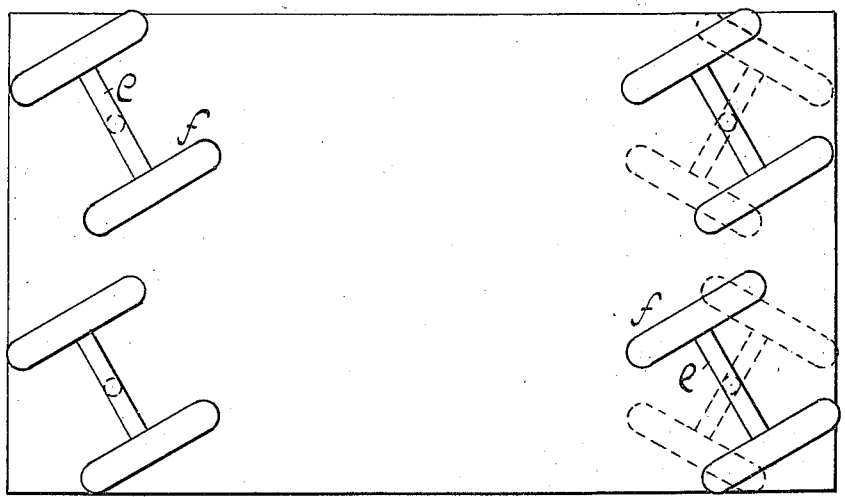

UNITED STATES PATENT OFFICE.

EDWARD G. SCHLEICHER, OF STAMFORD, CONNECTICUT.

STEERING AND RUNNING GEAR FOR VEHICLES.

1,125,184.
Specification of Letters Patent.
Patented Jan. 19, 1915.

Application filed October 14, 1913. Serial No. 795,062.

*To all whom it may concern:*

Be it known that I, EDWARD G. SCHLEICHER, a citizen of the United States, residing at Stamford, in the county of Fairfield and State of Connecticut, have invented new and useful Improvements in Steering and Running Gear for Vehicles, of which the following is a specification.

This invention relates to a steering and running gear for vehicles which is essentially adapted for motor trucks and automobiles.

The steering devices can be controlled from both ends of the vehicle by two operators. The vehicle is equipped with two hand wheels at each end, so that when one man controls, he operates the two hand wheels at one end. The vehicle is equipped with four horizontally movable frames, which carry eight driving wheels for contact with the ground. The movable frames are connected to the steering posts so that when the posts are operated each frame is oscillated to steer the vehicle in the desired direction. In this device the wheels can be steered to any angle in turning corners, without danger of skidding and upsetting the vehicle. The forward and rear wheels can also be turned at right angles to the body or frame and the vehicle thus steered from any portion of the street with the sides of the body overhanging the curb. By means of the forward and rear control the vehicle can be practically steered within its own length.

Figure 1:
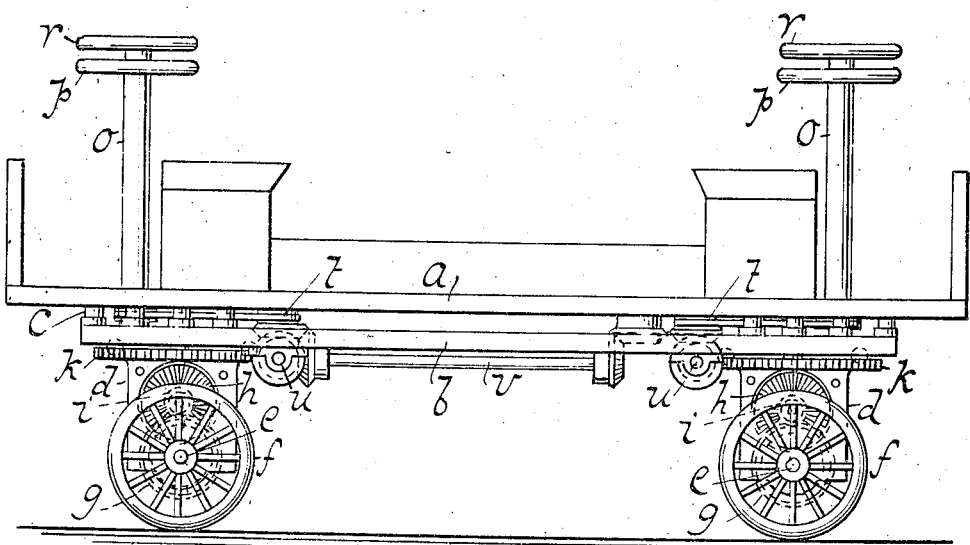
Figure 2:
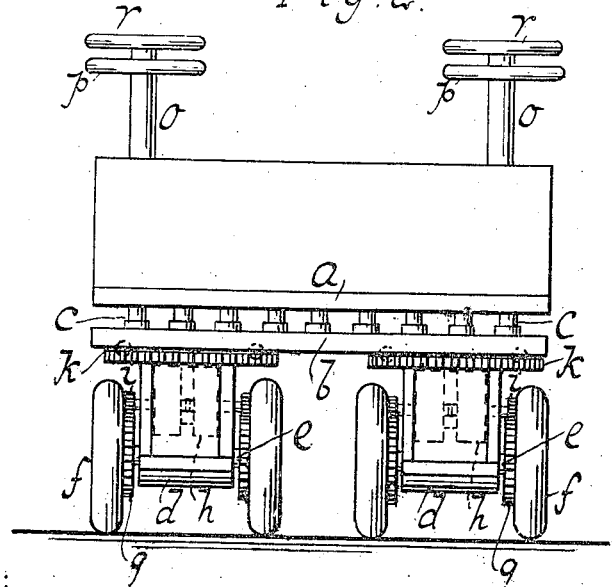
Figure 3:
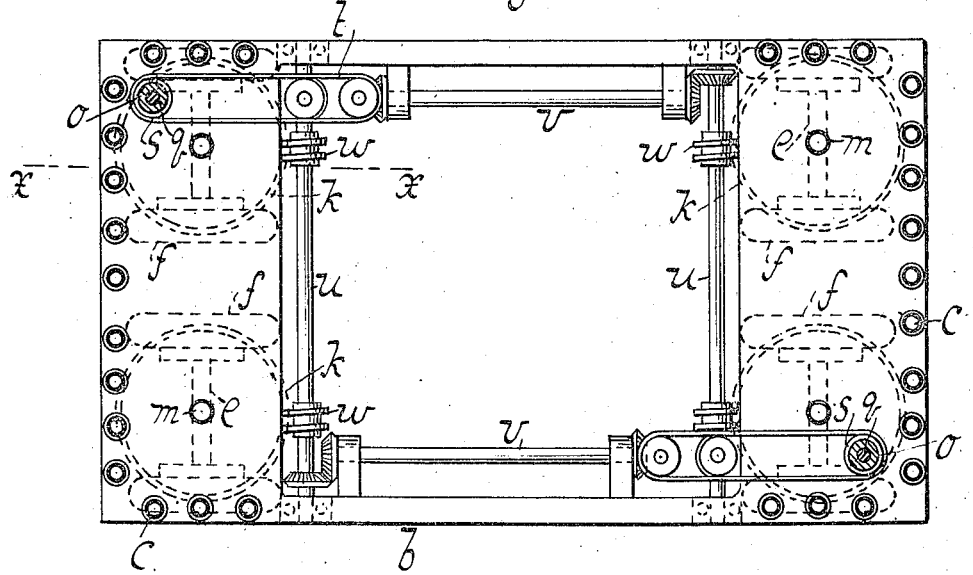
Figure 4:
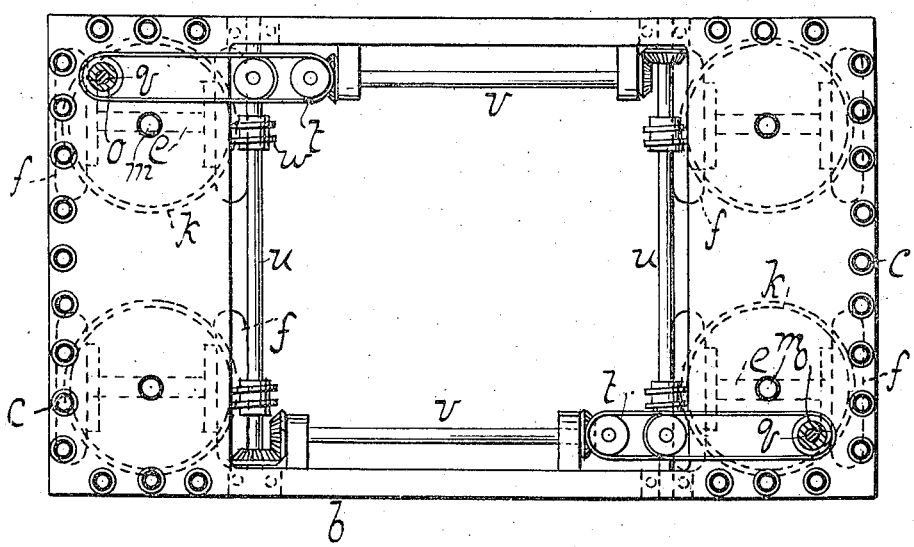

The novel features of the invention are more fully described in the following specification and claims and illustrated in the accompanying drawing in which:

Figure 1 represents a side elevation of a car embodying this invention. Fig. 2 is an end elevation of the same. Fig. 3 is a plan view of the same the frame having been removed. Fig. 4 is a similar view showing the wheels in a different position. Fig. 5 is a detail section taken along the line $x$ $x$ of Fig. 3. Fig. 6 is a diagrammatic view of the steering wheels.

In these drawings the letter $a$ designates a frame or body and $b$ is an intermediate frame or bolster. Between these frames are located a series of tubes provided with springs $c$ for taking up the shock. Below the bolster are located a series of movable frames $d$ each frame carrying a shaft or axle $e$. On each of these axles are loosely mounted a pair of wheels $f$ having toothed gear rings $g$. Two motors $h$ are mounted on each frame having pinions $i$ fixed to each rotor shaft. Each pinion engages one of the gears $g$ fixed to a wheel. The motors can be driven at different velocity in order to compensate for the variable velocity of the wheels, when turning curves or corners. The upper portion of each frame is provided with a gear $k$ having a stud $m$ for engagement with a hole located in the bolster. Between the bolster and the gear are positioned a series of balls $n$ to give easy rotation to the movable frame.

Mounted on each end of the frame $a$ is a sleeve $o$. Each sleeve has at its upper end a hand wheel $p$ for actuating the sleeve. Each sleeve has loosely mounted therein a post $q$ as indicated in Fig. 5, each post carrying a hand wheel $r$ at its upper end. The lower portion of the sleeves and the posts have fixed thereto pinions or wheels $s$. These pinions are connected by means of chains or belts $t$ and bevel gear connections to transverse transmission shafts $u$ and longitudinal transmission shafts $v$ best seen in Fig. 3. The transverse shafts $u$ have worm gears $w$ for engagement with the said gears $k$ carried by the movable frame.

It will be readily understood that when a pair of hand wheels at one end of the vehicle are actuated it will oscillate all the movable frames in unison as indicated in Fig. 6, and the body of the vehicle will point straight ahead, while passing another auto or going close to the curb. In turning a curve or corner the rear wheel can be steered in a diverse direction relative to the front wheel as indicated in dotted lines in Fig. 6. This is accomplished by operating the hand wheel $p$ in a reverse direction.

In heavy motor trucks the steering devices can be operated from either end, or an operator may be stationed at each end and control the steering devices by means of the upper hand wheel. In this device there are four oscillating frames, two at each end, each frame carrying two driven wheels so that there are always eight wheels in contact with the ground thereby giving proper balance to the body of the car. The four front and rear wheels are opposite each other and if some of the wheels strike an obstruction or rut in the road it will have no effect on the other wheels, and the traction of the car. In this instance it is desirable to have a motor geared to each wheel as shown or it may be possible to have only the rear wheels act as drivers.

An indicator may be attached to the posts or hand wheels so that the operator can see the position of each movable frame.

I claim:

1. In a motor vehicle the combination with a frame, of pairs of horizontally movable frames connected to the forward and rear portion of the frame, an axle carried by each movable frame, a pair of wheels mounted on each axle, worm gear transmission shafts coupled to the forward and rear movable frames, and means connected to the shafts for actuating the frames to any angle from the forward or rear of the vehicle.

2. In a motor vehicle the combination with a frame, of pairs of horizontally movable frames connected to the forward and rear portion of the frame, an axle carried by each movable frame, a pair of wheels mounted on each axle, worm gear and bevel gear transmission shafts for coupling the forward and rear frames, and means connected to the shafts for operating the frames to any angle from either end of the vehicle.

3. In a motor vehicle the combination with a frame, of pairs of horizontally movable frames mounted at the forward and rear portion of the frame, an axle carried by each frame, a pair of wheels mounted on each axle, steering posts located at the forward and rear portions of the frame, and means connected to the posts for actuating the movable frames.

4. In a motor vehicle the combination with a frame, of pairs of horizontally movable frames mounted at the forward and rear portion of the frame, an axle carried by each frame, a pair of wheels mounted on each axle, a pair of steering posts located at the forward and rear portion of the frame, and means connected to the posts for operating the movable frames.

5. In a motor vehicle the combination with a frame, of pairs of horizontally movable frames mounted at the forward and rear portions of the frame, an axle carried by each movable frame, a pair of wheels mounted on each axle, two motors mounted on each frame for driving the wheels, a pair of steering posts located at the front and rear portions of the frame; and means connected to the posts for oscillating the movable frames.

In testimony whereof I have hereunto set my hand in the presence of two subscribing witnesses.

EDWARD G. SCHLEICHER.

Witnesses:
 CARL F. RÜHLE,
 WM. E. WARLAND.